June 27, 1939.　　　F. SCHULTZ　　　2,164,258
SANITARY CONTINUOUS-FLOW ARTICLE HOLDER
Filed June 10, 1938
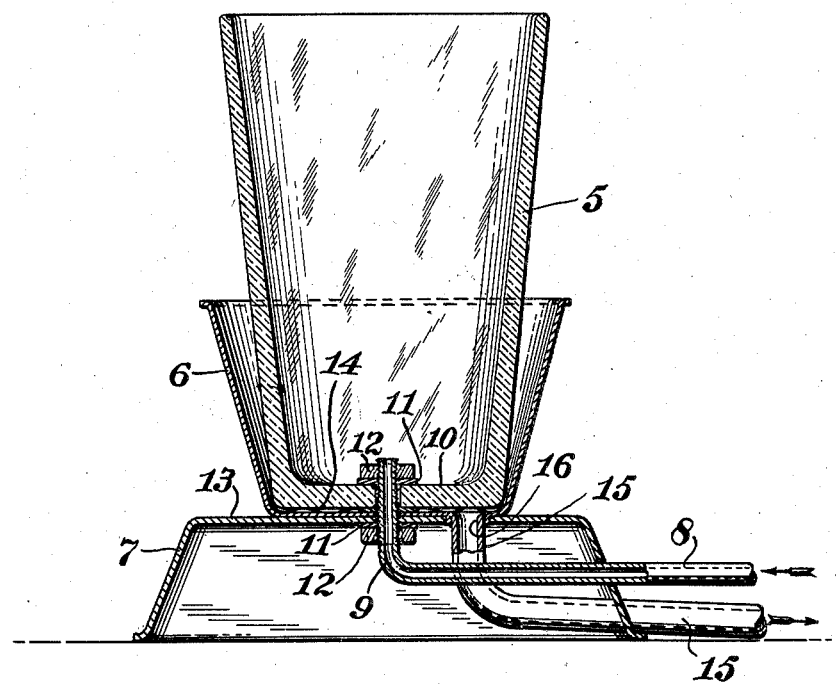
Inventor:
Frank Schultz, Patented June 27, 1939

2,164,258

UNITED STATES PATENT OFFICE 2,164,258

SANITARY CONTINUOUS-FLOW ARTICLE HOLDER

Frank Schultz, Martinsville, N. J.

Application June 10, 1938, Serial No. 213,083

1 Claim. (Cl. 141—1)

This invention relates to certain new and useful improvements in sanitary continuous flow article holder.

In the dispensing of beverages including beer, the top of the container or glass in which the beverage is served is usually capped by an effervescent layer or head of foam and it is the usual practice to move the straight edge of a scraper blade over the upper edge of the glass to remove the excess foam and such scraper blades after use are temporarily placed in a container or glass of water for cleaning the scraper blade. However, such practice does not thoroughly cleanse the scraper blade because the scraper blade holder glass is open to the atmosphere for the collection of foreign matter as well as the gathering of beverage in the glass resulting in a layer of scum or the like on the top of the water in the glass which clings to the scraper blade when the latter is removed for use.

It is therefore the primary object of this invention to provide a sanitary continuous flow beverage scraper holder in the form of a glass to which water is continuously supplied to overflow at the upper edge of the glass in a drain receptacle, a beverage scraper blade being placed in the glass thoroughly cleansed by the continuous flow of water which eliminates the collection of foreign matter in the water and assures a perfect cleansing of the scraper blade.

With the above and other objects in view that will become apparent as the nature of the invention is better understood, the same consists in the novel form, combination and arrangement of parts hereinafter more fully described, shown in the accompanying drawing and claimed.

In the drawing:

The figure is a vertical cross-sectional view of the sanitary continuous flow beverage scraper holder constructed in accordance with the present invention, the holder being illustrated in the form of a water glass having a water supply pipe extending through the bottom of the glass and the latter set into a drain receptacle.

Referring more in detail to the accompanying drawing, there is illustrated a sanitary continuous flow beverage scraper holder in the form of a water glass 5 set into an upwardly flaring drain receptacle 6 that is mounted upon a hollow base 7. The water glass 5, drain receptacle 6, and hollow base 7 are secured together by means of the water supply pipe 8 connected with a suitable source of water supply, such as a city service line, the pipe 8 passing through a side wall of the hollow base 7 and having an upwardly directed externally threaded angle end 9 passing through an axial opening in the bottom wall 10 of the water glass 5, and also through axial openings in the bottom wall of the drain receptacle 6 and in the top wall of the hollow base 7. The connection between the angle end 9 of the water supply pipe 8 and the holder is made water-tight by means of gaskets 11 and retaining nuts 12 threaded onto the pipe end 9 within the water glass 5 and below the top wall 13 of the hollow base 7.

To space the bottom wall 10 of the water glass 5 from the bottom wall of the drain receptacle 6, there is provided a series of corrugations 14 in the bottom wall of the drain receptacle 6 so that water overflowing from the water glass 5 will collect in the drain receptacle and beneath the bottom of the water glass 5. A drain pipe 15 has one end connected as at 16 with the bottom of the drain receptacle 6 adjacent the marginal edge thereof and said drain pipe 5 discharges at any point desired.

Water enters the bottom of the glass 5 through the water supply pipe 8 and overflows at the top of the glass to be received in the drain receptacle 6 and from which receptacle the water is drained through the pipe 15. It will be understood that the flow of water upwardly through the glass 5 is continuous and that beer or other liquids clinging to a scraper blade as well as all foreign matter on the scraper blade will be washed therefrom by the continuous flow of water so that water is constantly changing in the glass 5, with the result that a highly sanitary continuous flow beverage scraper holder is provided.

While there is herein shown and described the preferred embodiment of the invention, it is nevertheless to be understood that minor changes may be made therein without departing from the spirit and scope of the invention as claimed.

I claim:

In a sanitary continuous flow beverage scraper holder, a water glass, a drain receptacle in which the water glass is mounted and means for continuously supplying water to the glass with the water overflowing from the glass into the drain receptacle, a drain pipe in communication with the bottom wall of the drain receptacle and the bottom wall of the drain receptacle being corrugated with the bottom wall of the glass supported on said corrugated wall to provide a water flow passage in the drain receptacle between the bottom of the glass and the bottom wall of the receptacle, the water supply means including a pipe anchored at its discharge end in the bottom wall of the water glass, whereby the water continuously flows upwardly from the bottom of the glass to the top thereof for overflow into the drain receptacle.

FRANK SCHULTZ.